May 13, 1941.  O. E. FISHBURN  2,242,027
TRANSMISSION INTERLOCK
Filed Jan. 18, 1940    2 Sheets-Sheet 2
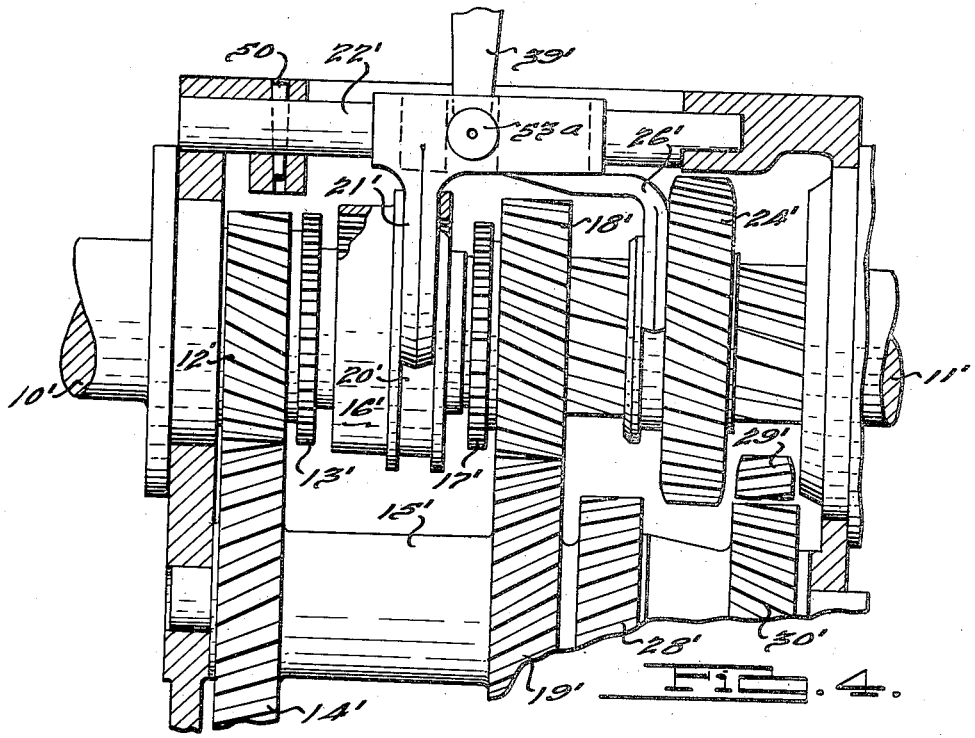
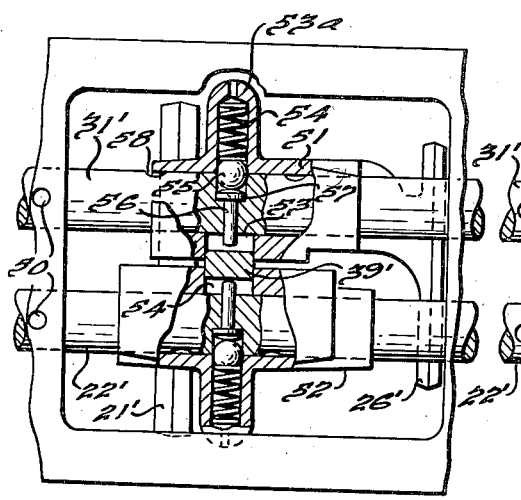
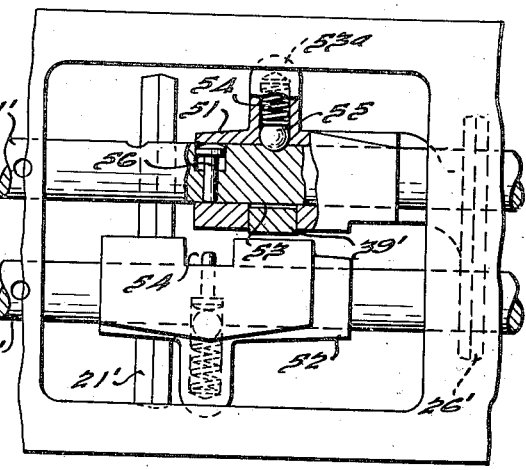
INVENTOR
Otto E. Fishburn.
BY Hamess, Lind, Patu & Harrie
ATTORNEYS.

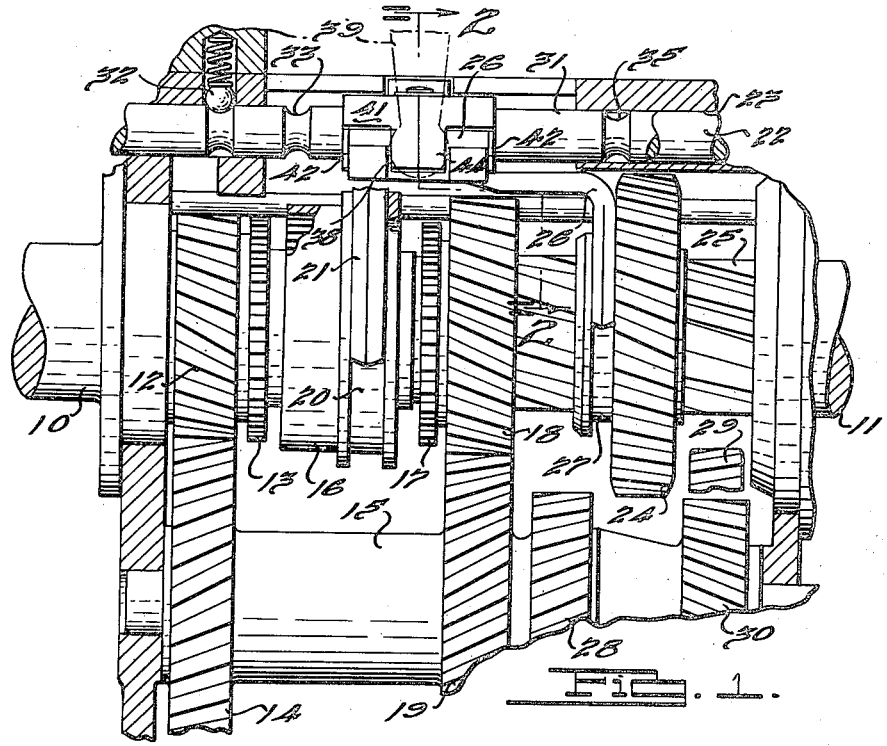

Patented May 13, 1941

2,242,027

UNITED STATES PATENT OFFICE 2,242,027

TRANSMISSION INTERLOCK

Otto E. Fishburn, Detroit, Mich., assignor to Chrysler Corporation, Highland Park, Mich., a corporation of Delaware Application January 18, 1940, Serial No. 314,530

2 Claims. (Cl. 74—475)

This invention relates to improvements in variable speed transmission mechanism.

More particularly, the invention pertains to improved means for locking the shiftable members of a variable speed transmission mechanism against involuntary movement.

The principal object of the invention is to provide, in a change speed transmission mechanism, a positive interlock for the shiftable members thereof which will prevent undesired movement of said members without interference with their shifting functions.

An additional object of the invention is to provide in such a mechanism an interlock which is automatically actuated to inoperative position with respect to one of the shiftable members whenever the transmission selector member is manipulated to select the said member preparatory to accomplishing a shift.

A further object is to provide a transmission interlock which shall be rapid in operation and positive in its action, yet simple in construction.

Additional objects of the invention will be apparent from the following description.

Reference is made to the accompanying drawings which illustrate two embodiments of my invention, and in which:

Fig. 1 is a partial sectional view of a change speed transmission mechanism embodying the invention.

Fig. 2 is a sectional view along line 2—2 of Fig. 1.

Fig. 3 is a partial top plan view of the apparatus of Figs. 1 and 2.

Fig. 4 is a view similar to Fig. 1 of a modified form of the invention.

Fig. 5 is a partial top plan view of the Fig. 4 apparatus showing the parts in neutral position.

Fig. 6 is a view similar to Fig. 5 of the Fig. 4 apparatus with the parts in one of their shifted positions.

In the drawings, like reference characters designate corresponding parts in the following description. In Fig. 1, 10 designates the input shaft of the transmission mechanism and 11 the output shaft. The former is adapted for driving connection to a vehicle motor through the usual clutch, and the latter is adapted for driving connection to the vehicle drive wheels.

The shaft 10 carries at its end a gear 12 and a clutch member 13. The gear 12 is in constant mesh with a gear 14 carried by the countershaft 15, and the clutch member 13 is adapted to be engaged by a mating clutch member 16 to establish direct drive setting of the transmission.

The clutch member 16 is slidably splined on the inner end portion of the output or tail shaft 11 which, in accordance with the usual practice, is piloted at its extreme inner end in a hollow bearing-receiving portion of the shaft 10.

The shaft 11 has a gear 18 journalled thereon, a set of clutch teeth 17 being formed integrally with said gear. The teeth 17 are adapted for engagement by the slidable clutch member 16 and the gear 18 is constantly meshed with a countershaft gear 19. Clutch member 16 is provided with a groove 20 which rotatably receives the tines of a shift fork 21 carried by a shift rail 22, the latter being slidable in bosses 23 formed in the transmission casing.

It may thus be seen that the clutch member 16 may be shifted forwardly (or to the left of Fig. 1) to engage the teeth 13 whereupon the shaft 10 will drive the shaft 11 direct; the gear 18 rotating freely because of its journalled mounting on shaft 11. By shifting the clutch member 16 to the rear into engagement with teeth 17, an intermediate speed setting of the transmission may be obtained, the drive passing from gear 12 to gear 14 thence to shaft 11 through gears 19 and 18.

A low and reverse driving gear 24 is splined on shaft 11 by splines 25 and is slidable by a fork 26 which engages the groove 27. The gear 24 may be shifted forwardly into mesh with a countershaft gear 28 to establish low speed setting of the transmission, or it may be shifted rearwardly into mesh with idler gear 29 to establish reverse setting, the idler gear being driven by a fourth countershaft gear 30.

The fork 26 is carried by a rail 31 which is slidable in the casing in a manner similar to rail 22. Suitable ball detents 32 are provided for engaging corresponding grooves 33 in the rails to releasably hold the shift rails in their various positions as is common in the art. An interlock pin 34 is adapted for alternate engagement with grooves 35 formed in each of the shift rails for locking one against movement when the other is shifted.

Shift forks 21 and 26 are fixed against movement relative to rails 22 and 31 respectively by set screws 36 and each fork is provided with a notch, designated 37—38 respectively for receiving a shift element 39. The element 39 may be operated by any suitable mechanism that will impart to the element the necessary selection and shifting motions, it being understood that the element 39 is intended to be moved transversely of the transmission casing for selective engagement with either the rail 22 or the rail 31, then axially to shift the selected rail.

Rail 31 is provided with an interlocking latch 41 which is of yoke-like form and has oppositely disposed journal portions 42 which fit around the rail and snugly abut the upper portion of the fork 26. A coil spring 43 carried in a suitable recess in the fork 26 abuts a finger-like portion 44 of the latch 41 which extends into the notch 38. A second finger-like portion 45 is adapted for engagement with a notch 46 cut in the side wall 40 of the casing, as shown in Fig. 2.

Normally the spring 43 urges the latch 41 into the position shown in the drawings with the finger 45 engaged in the notch 46 thus locking the rail 31 and fork 26 against shifting movement. When the shift element 39 is moved into engagement with the notch 38 of fork 26 preparatory to shifting the same, the latch 41 is rotated against the spring 43 sufficiently to disengage the finger 45 from the notch 46 thus freeing the rail 31 and fork 26 for movement. Upon movement of rail 31 past neutral position, the latch 41 will engage the notch 46 and lock the rail in neutral unless the shift element 39 is pressed into the groove 38 with sufficient force to compress spring 43.

The aforesaid arrangement facilitates easy and smooth shifting of the transmission. If a shift from low speed to reverse, or vice versa, is being made, the driver maintains sufficient pressure on the element 39 to keep the spring 43 depressed. When shifting from low to intermediate speed, the pressure on the element 39 may be relieved and when neutral position of the parts is reached, the finger 45 will automatically engage the notch 46 thereby stopping rail 31 in neutral. At the same time, the spring 43 will urge the finger 44 toward the notch 37 in fork 21, thus transmitting a desirable "feel" back to the hand of the driver which informs him of the position of the parts.

A further important advantage of the aforesaid shifting mechanism resides in the fact that it permits fast gear changing without danger of damage to the parts. It frequently occurs that transmissions of the type illustrated become damaged when a rapid shift is attempted, because the momentum acquired by one rail carries it past neutral position after the shifting element has crossed over and picked up the other rail to shift it. In such instances the interlock pin 34 is of no assistance because it cannot act until the other rail is moved. The shift from low speed seems to be the major source of trouble in this respect. When, for example, a fast shift is being made from low speed to second speed, the shift element 39 which has previously been engaged in the notch 38 of fork 26 for the shift into low speed crosses over and engages the notch 37 of fork 21 when the rail 31 has moved toward the right of Figs. 1 and 3 sufficiently to align the notches 37 and 38. The momentum acquired by the rail 31 during its movement out of low speed position may cause the rail to continue past neutral position after the shift element 39 has been disengaged from the notch 38. This may cause damage to the transmission parts because if the rail 31 continues on past neutral position far enough, the gear 24 will abut the gear 29 and inasmuch as these gears are rotating in opposite directions at this instant, clashing and possible damage will result. At the same time, of course, the rail 22 will be locked against movement against the interlock pin 34 and the shift element 39 will be interrupted in its intended movement toward the right. Thus it may be seen that in addition to the danger of damage to the transmission parts, shifting movement of the element 39 is abruptly interrupted and an undesirable shock will be transmitted back to the hand of the driver. With the latch 41 incorporated in the transmission mechanism danger of an occurrence such as that aforesaid is eliminated. As soon as the rail 31 reaches neutral position, the finger 45 of latch 41 will snap into engagement with the notch 46 thereby locking the rail 31 against movement. The element 39 may then cross over and pick up the rail 22 for the shift into second or intermediate speed.

When the parts are in neutral, which is the position shown in Figs. 1 and 3, the shift element 39 is in partial engagement with both the notch 37 and the notch 38 and inasmuch as the rail 31 is locked in neutral by the latch 41, the rail 22 will also be locked in neutral position and accidental movement of the rails is prevented.

Figs. 4, 5 and 6 illustrate a modified form of the invention in which a slightly different form of rail lock is provided. In Figs. 4, 5 and 6, both of the transmission rails are locked when in neutral position and it is desired to point out that similar provision could be made in the form of the invention shown in Figs. 1, 2 and 3 by providing a latch similar to the latch 41 for rail 22. Such a modification of the apparatus shown in Figs. 1, 2 and 3 would involve only a duplication of the latch mechanism for the rail 22.

In Figs. 4, 5 and 6, parts corresponding to similar parts in Figs. 1, 2 and 3 have been given the same reference numeral with the addition of a prime. The transmission illustrated in Fig. 4 is generally similar to that illustrated in Fig. 1 and the description thereof will not be repeated, it being deemed sufficient to describe those parts of the mechanism which differ from those previously described.

In Figs. 4 to 6, inclusive, the transmission shift rails 22' and 31' are not slidable but are retained against axial movement by pins 50. The high and low speed shifter forks 21' and 26' respectively have enlarged portions designated 51 and 52 respectively which are adapted to mount the forks on the shift rails for sliding movement relative thereto. As can be more clearly seen from Fig. 5 the fork portions 51 and 52 are provided with notches 53 and 54 respectively which are adapted to receive the shift element 39'.

Each of the fork portions is provided with a boss-like projection 53a which has a hollow bore in which is disposed a coil spring 54 and a ball 55. The latter is adapted to protrude into a similar bore formed in the stationary rail 31' which bore has a reduced inner portion in which is disposed a pin 56 having a head 57 which limits outward movement of the pin under the influence of the spring 54.

The parts are designed in such manner that the pin 56 projects into the notch 53 where it is adapted to be engaged by the shift element 39' upon movement of said element into said notch preparatory to shifting the member 51. The rail 31' is provided with two depressions 58 which are adapted to be engaged by the ball 55 when the member 51 is shifted to engage the gear 24' with either the low speed gear 28' or the reverse idler gear 29'. As can be seen from Fig. 5, the ball 55 engages both the member 51 and the rail 51' when the parts are in neutral and prevents movement of the member 51 relative to the rail 31'. Upon movement of the shift element 39' into the notch 53 preparatory to shifting the member 51 along the rail 31', the member 39' engages the protruding outer end of the pin 56 and moves the pin inwardly which in turn compresses the spring 54 and moves ball 55 out of engagement with rail 31'. The member 51 is thereby unlocked and may be shifted longitudinally of the rail 31', the ball 55 rolling along the rail until it reaches one or the other of the depressions 58 in which it is adapted to engage and function as a releasable detent.

Fig. 6 shows the positions of the various parts when the member 51 has been shifted to establish reverse setting of the transmission which involves meshing the gear 24' with the reverse idler gear 29'. The ball 55 has engaged the right hand depression 58 of rail 31' to thereby assist in maintaining the member 51 in reverse drive position. The pin 56 is retained in non-interfering position relative to the member 51 and the rail 31' by engagement with the inner sliding surface of the member 51.

Upon movement of the member 51 toward the left of Fig. 6 the ball 55 will engage the pin 56 when neutral position is reached to thereby lock the member 51 in neutral position unless shift element 39' is maintained in engagement with the notch 53 with sufficient pressure to overcome the pressure of the spring 54.

While it is usually necessary to provide the low-reverse shift fork or rail only with a lock means to prevent overtravel past neutral position, it is sometimes desirable to provide lock means for the second-high rail also and such is provided by the mechanism shown in Figs. 4 to 6 inclusive. The member 52 is similar in construction to the member 51 and the lock means operates in an identical manner. When the parts are in neutral position as shown in Figs. 4 and 5, both of the pins 56 are urged to their limit of movement by the springs 54 and both of the balls 55 are in engagement with the relatively slidable members thereby locking both of the shift forks in neutral position. Either rail is unlocked as soon as the shift element 39' is moved into engagement with the corresponding notch preparatory to shifting thereof.

Although but two embodiments of my invention have been described, it is desired to point out that it is not my intention thereby to limit the invention in its broader aspects to the particular mechanism shown and described herein.

What I claim is:

1. In a change speed transmission mechanism having a casing and a rail fixed in said casing, a shift fork shiftable along said rail and operable to establish different speed ratio drives; a shift finger adapted for movement into engagement with said fork for shifting the same along said rail; a spring urged detent ball carried by said fork; recesses in said rail for releasably receiving said ball thereby to yieldably lock said fork in ratio establishing positions; a recess in said rail for non-releasably receiving said ball thereby to positively lock said fork in neutral position; and means for forcing said ball out of said last mentioned recess upon movement of said finger into engagement with said fork whereby said fork is unlocked for shifting.

2. In a change speed transmission mechanism having a casing and a rail fixed in said casing, a shift fork shiftable along said rail and operable to establish different speed ratio drives; a shift finger adapted for movement into engagement with said fork for shifting the same along said rail; a spring urged detent ball carried by said fork; recesses in said rail for releasably receiving said ball thereby to yieldably lock said fork in ratio establishing positions; a recess in said rail for non-releasably receiving said ball thereby to positively lock said fork in neutral position; a plunger carried by said rail having a head disposed in said last mentioned recess; said plunger being engageable by said shift finger on the movement thereof to engage said fork to thereby push said ball out of said recess.

OTTO E. FISHBURN.